June 18, 1935. H. W. DAUDT ET AL 2,005,706
ORGANIC FLUORINE COMPOUNDS
Filed Aug. 10, 1932 2 Sheets-Sheet 2

INVENTORS
Herbert W. Daudt
Mortimer A. Youker
BY
ATTORNEY.

Patented June 18, 1935

2,005,706

UNITED STATES PATENT OFFICE 2,005,706

ORGANIC FLUORINE COMPOUND

Herbert Wilkens Daudt and Mortimer Alexander Youker, Wilmington, Del., assignors to Kinetic Chemicals Inc., Wilmington, Del., a corporation of Delaware Application August 10, 1932, Serial No. 628,154

27 Claims. (Cl. 260—166)

This invention relates to organic fluorine compounds, more particularly fluorinated derivatives of acyclic hydrocarbons and a process for the production thereof.

It is an object of the invention to provide a new and improved process for producing organic fluorine compounds. A further object is to produce organic fluorine compounds from acyclic hydrocarbon derivatives by a fluorination reaction which proceeds smoothly and, if desired, continuusly without undesirable side reactions. Another object is to provide a vapor phase process for the production of organic fluorine derivatives. A further object is the provision of a solid, substantially non-volatile and non-toxic fluorinating catalyst. An additional object is the provision of a fluorinating catalyst the activity of which is not seriously impaired by water. A still further object is the production of new organic fluorine compounds. Other objects will appear hereinafter.

These objects are accomplished according to the broader aspects of the invention by reacting together a fluorinating agent and a compound containing one or more acyclic carbon atoms attached to one or more halogen atoms other than fluorine, in the presence of a solid substantially non-volatile and non-toxic fluorinating catalyst.

Figure 1:
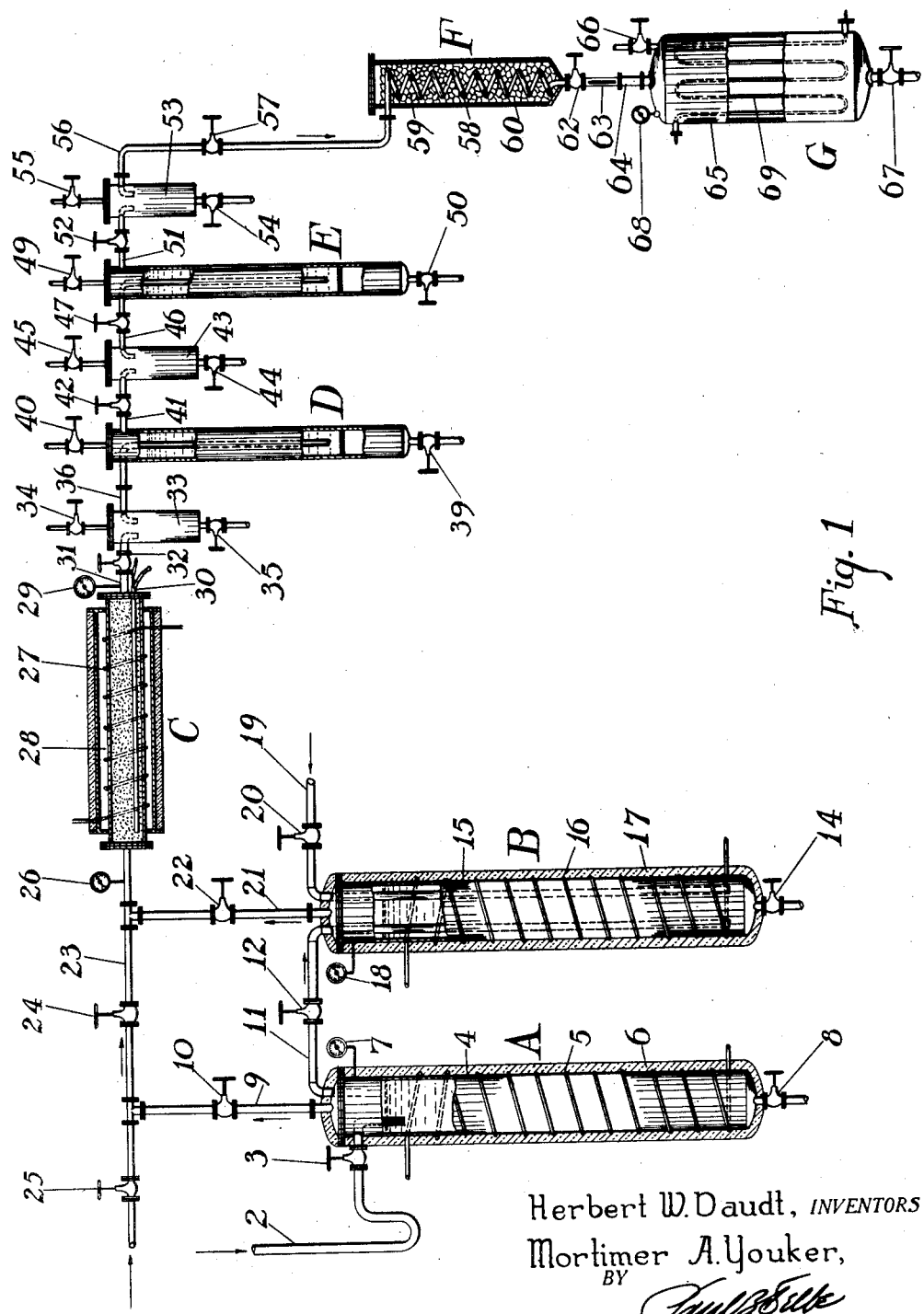
Figure 2:
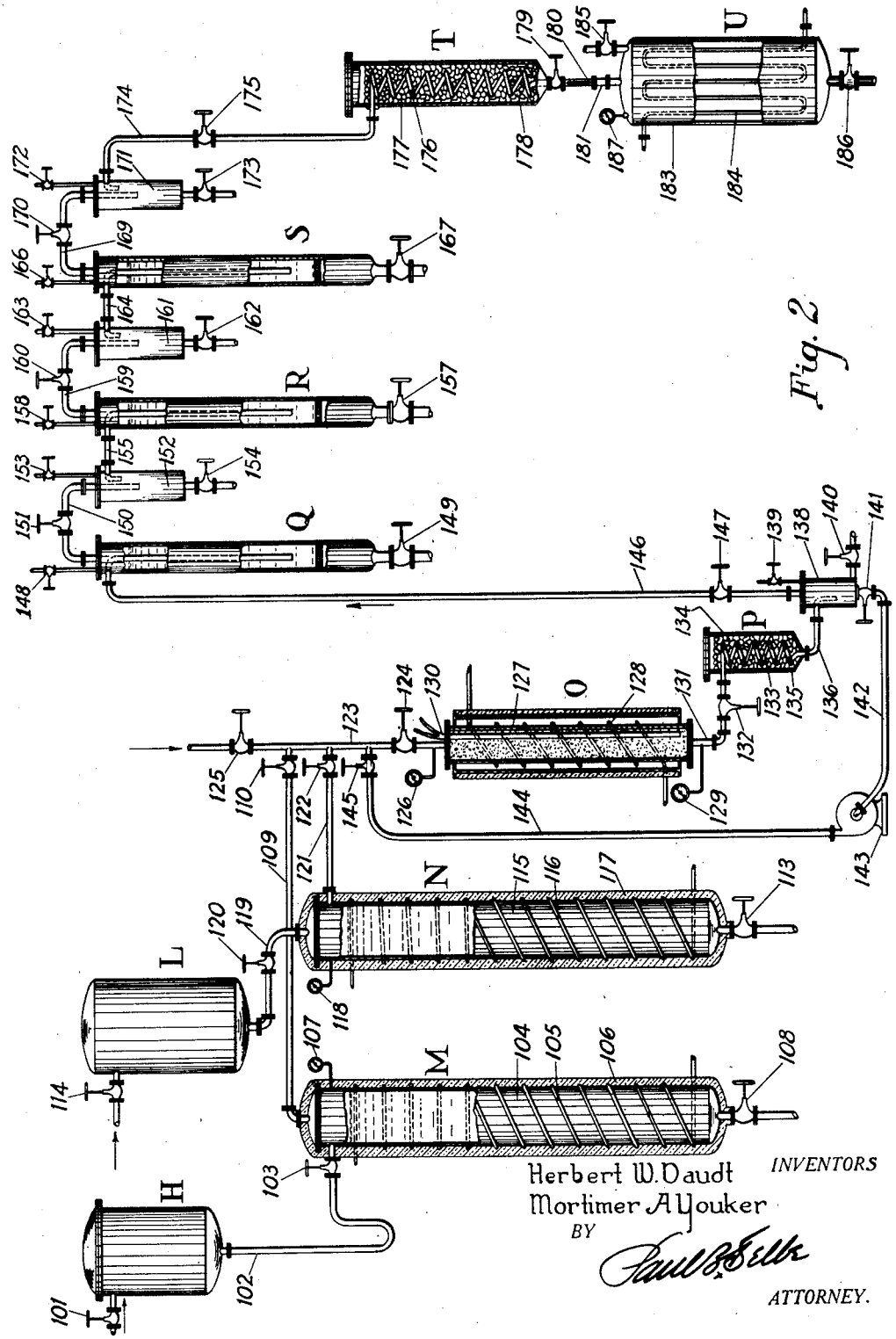

The invention may be well illustrated by the processes hereinafter described and the forms of apparatus shown in the accompanying drawings in which Figure 1 is a side view partly in section and somewhat diagrammatic of one form of apparatus for carrying out the invention and, Figure 2 is a similar view of a modified form of apparatus.

Similar characters refer to similar parts throughout the drawings.

In practicing the invention we have found that very desirable results are obtained by reacting together hydrogen fluoride and a compound containing an acyclic carbon atom having attached thereto a halogen other than fluorine (that is, a halogen having an atomic weight greater than 19) in the presence of a solid catalyst such as carbon. This may be done conveniently in a reactor such as shown at C (Fig. 1) or O (Fig. 2) by placing in said reactor the carbon catalyst, heating the catalyst and passing through the heated catalyst hydrogen fluoride and the acyclic halogen derivative. As a result of the reaction the acyclic halogen derivative has a part or all of its halogen content (other than fluorine) replaced by fluorine. The resultant gaseous fluorinated product together with any hydrogen halide formed or persent is then led into a scrubber filled with some material capable of removing the hydrogen halide. This may conveniently be a container filled with a solution of caustic alkali, milk of lime or the like, as shown at D (Fig. 1) and R (Fig. 2). In some cases it may be desirable to further purify the products by other methods. Thus, removal of hydrogen halide, at least in part, may be effected by means of a water scrubber such as shown at Q (Fig. 2). If desired, the reaction products before passing through the hydrogen halide remover or removers may be passed through a preliminary condenser (shown at P in Fig. 2) whereby a part of the unconverted reactants, products or mixtures thereof are liquefied and subsequently removed. In case this preliminary condenser is used to remove unconverted reactants or intermediate products these may be recycled for use as starting materials.

In case aqueous scrubbing agents are used to remove the hydrogen halides from the fluorinated product the gas will become mixed with water vapor. Subsequently it may be conveniently dried by passing it through a drying scrubber such as shown at E (Fig. 1) or S (Fig. 2). This scrubber will ordinarily contain sulfuric acid, stick caustic or the like. For convenience of storage and transportation the resultant fluorinated product may be liquefied.

This liquefaction may be accomplished by passing the gaseous product through a condenser, such as shown at F (Fig. 1), and T (Fig. 2). Following its condensation the liquefied product may be run into storage containers such as are illustrated at G (Fig. 1) and U (Fig. 2).

The invention will be more fully understood by reference to the following detailed description. For convenience, the processes are described in connection with specific substances, namely, hydrogen fluoride, carbon tetrachloride (the acyclic halogen compound) and carbon (the catalyst).

Referring to Figure 1, vessel A is a vaporizer consisting of a container 4, surrounded by heating coils 5 and lagging 6 and provided with a pressure gauge 7 and a valved bottom outlet 8. Vessel B is another vaporizer consisting of a container 15 surrounded by heating coils 16 and lagging 17 and provided with a pressure gauge 18 and a valved bottom outlet 14.

According to one method of operating the process, liquid hydrogen fluoride is introduced into vaporizer A through line 2, controlled by valve 3, and is gasefied. Valves 8 and 10 are closed and valve 12 is open, allowing the gaseous hydrogen fluoride to pass from vaporizer A through line 11 to vaporizer B. In vaporizer B, the outlet valve 14 is closed. Carbon tetrachloride, introduced into vaporizer B through line 19 and valve 20, is heated and vaporized in the presence of the hydrogen fluoride. The resultant gaseous mixture passes through line 21, controlled by valve 22 and thence (valve 24 being closed) through line 23 into the reactor C. Alternatively, valves 12 and 25 may be closed and valves 10 and 24 open, allowing gaseous hydrogen fluoride and carbon tetrachloride to pass separately through lines 9 and 21, respectively, and thus into the reactor C by way of line 23. If desired, a halogen, or the reactants may be introduced from an outside source through valved inlet 25.

The reactor C consists of a tube 28 provided with heating means such as, for example, an electrical furnace 27 and a thermo-couple or other suitable temperature indicating device 30. The catalyst is disposed on the inside of the tube 28. This tube may or may not be full of catalyst. Thus, a part of the space may be free or occupied by an inert material. The inlet and outlet pressures are determined by means of gauges 26 and 29, respectively.

It is probable that the reaction taking place in reactor C produces some of each of the compounds CCl₃F, CCl₂F₂, CClF₃. In any event by proper regulation of conditions such as temperature and pressure of the reaction, time of contact of the reactants with the catalyst, relative proportions of the ingredients, etc. the production of the desired compound or compounds is maintained at a maximum.

The mixture of the fluorinated product, (which itself may or may not be a mixture) and hydrogen chloride containing small proportions of unconsumed carbon tetrachloride and hydrogen fluoride leaves the reactor C through line 31. The mixed gases pass through valve 32 into a trap 33. This trap has a valved vent 34 and a bottom valved outlet at 35 for use in case it is desired to remove gases or liquids from the system at this point. The gases leave the trap through line 36 and pass into a body of aqueous alkali metal hydroxide in scrubber D. This scrubber is preferably of the circulating type having a valved inlet 40 and a valved bottom outlet 39, both of which are connected to a reservoir (not shown) of the scrubbing material. The neutral fluorinated product, leaves this scrubber through line 41 controlled by valve 42 and passes into a second trap 43 which has a bottom valved outlet at 44 and a valved vent at 45.

The gases leave trap 43 through line 46 and valve 47 and pass through sulfuric acid (preferably 85–95%) in scrubber E. Scrubber E is also of the circulating type having a valved inlet 49 and a bottom outlet through valve 50. The gases after being dried, pass through line 51 and valve 52 into a trap 53 having a bottom outlet 54 and a vent 55. From trap 53, the gases pass through line 56 and valve 57 into coil 58 surrounded by a suitable refrigerant (such as solid carbon dioxide) indicated at 59 and held in container 60, all of which constitute condenser F.

The liquefied product runs through valve 62, sight-glass 63 and line 64 into a storage vessel generally indicated at G. The illustrated storage vessel G consists of a container 65 having a valved vent 66 and a valved outlet 67 and being provided with a pressure gauge 68. The temperature of the storage container is maintained as desired by a suitable refrigerant, for example, carbon dioxide, circulating in coil 69.

In the modification of the apparatus shown in Fig. 2, reactor O comprises a vertical catalyst tube 127 surrounded by a heating means such as an electrical furnace 128 and provided with a thermocouple 130. The pressures at the inlet and outlet ends of the tube are indicated by gauges 126 and 129, respectively.

Hydrogen fluoride is introduced into vaporizer M from weigh-tank H through line 102 and valve 103. Weigh-tank H is equipped with a valved inlet 101. Vaporizer M is similar in construction to vaporizer A (Fig. 1) and comprises a container 104 surrounded by heating coils 105 and lagging 106 and equipped with a pressure gauge 107 and valved outlet 108. Carbon tetrachloride is introduced from weigh-tank L into vaporizer N through line 119 and valve 120. Weigh tank L is provided with a valved inlet 114. Vaporizer N is similar in construction to vaporizer B (Fig. 1) and consists of a container 115 surrounded by heating coils 116 and lagging 117 and provided with a pressure gauge 118 and a valved outlet 113. Under ordinary operating conditions the valves at 108 and 113 are closed.

Gaseous carbon tetrachloride from vaporizer N passes through line 121 and valve 122 into line 123 and there mixes with hydrogen fluoride vapor introduced into line 123 from vaporizer M through line 109 and valve 110. The gaseous mixture then passes through valve 124 into the reactor O containing therein a suitable amount of a carbon catalyst maintained at the desired reaction temperature. If desired, a halogen and/or the reactants compressed or otherwise, may be introduced into the reactor by way of valved inlet 125, line 123 and valve 124.

In the apparatus of Fig. 1, the gaseous reaction product containing the fluorinated compound or compounds, hydrogen chloride, and unconverted carbon tetrachloride passes from the reactor C into trap 43 prior to entering scrubber D.

In Fig. 2, the mixed gases pass through line 131 and valve 132 into a preliminary condenser P comprising coils 133 surrounded by a suitable refrigerant indicated at 134 and held in container 135. The condensation temperature is regulated to liquefy at least a part of the unconverted reactants and, if desired, some of the reaction products. The liquid product and the gaseous fluorinated product and hydrogen halides, then pass through line 136 into trap 138. This trap is provided with a valved vent 139 and two bottom outlets controlled by valves 140 and 141. Liquids falling to the bottom of the trap may be removed through the outlet 140; or, if desired, may be passed through valve 141 and line 142 to pump 143, and recycled through line 144 and valve 145 for use again in the process. This recirculation may be intermittent or continuous as desired.

The gaseous fluorinated product and hydrogen halides leave trap 138 through line 146 controlled by valve 147 and pass into a water scrubber Q of the circulating type provided with a valved inlet 148 and a valved outlet 149 which may be regulated as desired. This scrubber serves to remove some of the hydrogen halides. The remaining gases pass through line 150 and valve 151 to a trap 152 provided with a valved vent 153 and a valved outlet 154. From trap 152 the gases pass through line 155 into a scrubber R containing a body of aqueous alkali metal hydroxide. This scrubber is of the circulating type and similar in construction to scrubber D (Fig. 1).

It has a bottom outlet through 157 and may be filled through a valved inlet 158. The substantially neutral gas leaves scrubber R through line 159 and valve 160 and passes through trap 161 into line 164. This trap has a bottom outlet through valve 162 and a vent through valve 163.

From line 164 the gases pass through a quantity of drying material (for example, sulfuric acid) in scrubber S. This scrubber is also of the circulating type and is similar in construction to scrubber R (Fig. 1) being provided with a valved inlet at 166 and a bottom outlet through valve 167.

The dry neutral gas leaves scrubber S through line 169 controlled by valve 170 and passes through a trap 171 provided with a vent through a valve 172 and a bottom outlet through valve 173. From trap 171 the gas passes through line 174 and valve 175 to a condenser T comprising a coil 176 surrounded by a suitable refrigerant, indicated at 177 in container 178. The condensate passes through valve 179, sight-glass 180 and line 181 into a storage unit generally indicated at U. The illustrated storage unit comprises a storage vessel 183 cooled to the proper temperature by a suitable refrigerant circulating in coils 184. The storage vessel is also provided with a valved vent 185 and a valved outlet 186 and a pressure gauge 187.

It will be understood that the forms of apparatus shown are merely conventionally illustrated and may vary widely in details of a character well-known in the industry. Other suitable scrubbers such as those of the non-circulating type may be employed. Obviously, the various traps should be sufficiently large to collect liquids which may escape or flow from the scrubbers or condensers.

Those portions of the apparatus which come into contact with the hydrogen halide during the reaction have usually been made of some corrosion resistant material such as copper and Monel metal. In certain instances it may be desirable to make the hydrogen halide removers of lead or similar material. After the corroding materials have been removed from the gas stream, ordinary materials of construction may be used, for example, cast iron, wrought iron, steel and the like.

The invention will be further understood from a consideration of the following examples in which the parts are given by weight:

Example I

In an apparatus similar in principle to that of Fig. 1, gaseous hydrogen fluoride was passed through liquid carbon tetrachloride, heated to about 70° C. The mixture of vapors was then passed through a column of granular charcoal maintained at a temperature of about 400° C. At a rate of flow of about 30 parts of hydrogen fluoride per hour, a utilization of about 86% of the hydrogen fluoride was obtained.

The exit gases from the catalyst were washed with water, caustic and sulfuric acid. During the operation the caustic and sulfuric acid scrubbers and the intermediate trap were held at a temperature of about +50° to +60° C. The product, condensed at a temperature of about −40° to −50° C. by means of a suitable refrigerant and recovered in liquid form, was then fractionally distilled to yield about 30% difluoro-dichloro-methane, 60% fluoro-trichloro-methane and 10% carbon tetrachloride.

Example II

In an apparatus similar in principle to that of Fig. 1, hydrogen fluoride gas was passed through boiling chloroform and the mixture of vapors was then passed up through a column of charcoal about twenty inches high and three-fourths of an inch in diameter. The temperature of the charcoal was gradually raised from 50° to 300° C. The reaction started at about 200° C. and progressed smoothly at about 300° C. At a rate of feed of about 26 parts of hydrogen fluoride per hour approximately 85% of the hydrogen fluoride reacted.

The gaseous products obtained after passage through the catalyst were washed with an aqueous sodium hydroxide solution and sulfuric acid (about 90 to 95%). They were then condensed at a temperature of about −20° to −30° C. The condensate was fractionally distilled and was found to consist of approximately 10% difluoro-dichloro-methane, 60% fluoro-dichloro-methane and 30% chloroform.

Example III

Hydrogen fluoride vapor was passed through trifluoro-trichloro-ethane, heated to a temperature of about 20°–25° C. and the mixture of vapors was then passed through a column of small pieces of carbon maintained at a temperature of about 500°–600° C. The reaction product was washed free from acid, dried, condensed and subsequently fractionally distilled. Under the conditions of reaction approximately 50% of the hydrogen fluoride was utilized with a passage of about 40 parts of hydrogen fluoride per hour. The products isolated by fractional distillation were pentafluoro-chloro-ethane ($C_2F_5Cl$) and tetrafluoro-dichloro-ethane ($C_2F_4Cl_2$). The pentafluoro-chloro-ethane which is apparently a new product never before isolated boils at about −40° C. at atmospheric pressure. The tetrafluoro-dichloro-ethane boils at about +4° C. at atmospheric pressure.

Example IV

In an apparatus of the type described in Figure 2, 20 parts of substantially anhydrous hydrogen fluoride and 150 parts of carbon tetrachloride were hourly vaporized in vaporizers of the type described at M and N, respectively. The gaseous products were mixed and the resultant mixture passed through a column of 260 parts of a commercial grade of granular active carbon (density about 0.5) maintained at a temperature of approximately 400° C. in a catalyst chamber of the type shown at O. In this case the metal tubular chamber containing the column of carbon had a length of approximately 50 times its diameter. Heat was supplied to the catalyst bed by means of an electrical furnace 128. The mixture of gases leaving the carbon catalyst consisted of hydrogen chloride, dichloro-difluoro-methane, trichloro-fluoro-methane, and some unreacted hydrogen fluoride and carbon tetrachloride. This gaseous mixture was cooled in a suitable preliminary condenser, such as shown at P, which was maintained at a temperature of about 45° C. The condensate consisting mostly of carbon tetrachloride was separated in a trap such as shown at 138 (Fig. 2). This condensate may be recirculated as previously described. Where dichloro-difluoro-methane is the only product desired the condenser may be maintained at a temperature of —10° C. in order to condense also most of the trichloro-fluoro-methane. This condensate may also be recirculated as described.

The hydrogen chloride and hydrogen fluoride were then removed from the gas stream by contact with water and an aqueous 9–10% caustic solution in a scrubber, such as shown at Q and R, respectively. The gases were then dried by passage through sulfuric acid of about 90 to 95% concentration in a scrubber such as shown at S and subsequently condensed in a suitable condenser, such as shown at T, said condenser being maintained at a temperature of about —50° C. The liquid product was a mixture of dichloro-difluoro-methane, trichloro-fluoro-methane and a small amount of carbon tetrachloride.

The dichloro-difluoro-methane and the trichloro-fluoro-methane were obtained in a pure state by fractional distillation of the crude product, the distillation preferably being carried out under superatmospheric pressure. Yields of 85–90% based upon hydrogen fluoride were obtained.

Example V

In an apparatus similar in principle to that illustrated by Fig. 2, 20 parts of hydrogen fluoride and 150 parts of chloroform were hourly vaporized and passed through 260 parts of granular carbon catalyst maintained at a temperature of about 300° C.

During the operation, the preliminary condenser was maintained at a temperature of about 0° C. The caustic and sulfuric acid scrubbers were maintained at about 50° C. and the condensers and the receivers were held at approximately —60° C. The condensate consisted substantially of dichloro-fluoro-methane, chloro-difluoro-methane, and some chloroform. The various components of this crude product were then separated by suitable fractional distillation. Difluoro-chloro-methane boils at about —15° C. under a total pressure of about 1520 mm. of mercury, while fluoro-dichloro-methane boils at about +8.7° C. under atmospheric pressure. In the fractional distillation therefore, it is desirable to start the distillation under superatmospheric pressure and allow the pressure to drop to atmospheric pressure when substantially all of the difluoro-chloro-methane has been distilled. Any chloroform recovered may be used again in the operation. The yield of fluorinated products based upon hydrogen fluoride was approximately 85 to 90%.

Example VI

The apparatus and general mode of procedure described in Example V was also applied here. Twenty parts of hydrogen fluoride and 250 parts of trifluoro-trichloro-ethane were hourly vaporized and passed through 260 parts of carbon catalyst, maintained at a temperature of about 500° C. The preliminary condenser was operated at about 0° C. The temperature of the caustic and sulfuric acid scrubbers was maintained at about 40° C. The final condenser was maintained at about —50° to —60° C.

Tetrafluoro-dichloro-ethane and pentafluoro-chloro-ethane were obtained by fractionation of the dry crude product. The yields based upon hydrogen fluoride were of the order of about 50%.

Example VII

Twenty parts of hydrogen fluoride and 150 parts dichloro-ethane were hourly vaporized and passed through about 260 parts of activated carbon maintained at a temperature of about 300° to 400° C. the apparatus employed being similar in principle to that described in Fig. 2. The partial condenser was maintained at a temperature of about 20° C. The gases wer purified, dried and condensed in an analogous manner to that described in the other examples. The products obtained by fractional distillation were fluoro-chloro-ethane, difluoro-ethane, vinyl fluoride and vinyl chloride. The amounts of the vinyl compounds produced were increased by operation at higher temperatures.

According to the invention, halogens other than fluorine attached to acyclic carbon atoms may be replaced by fluorine. Where the acyclic carbon atom or atoms have attached thereto more than one halogen having an atomic weight greater than 19 (that is, greater than fluorine) the fluorination may be regulated to replace the desired number of halogen atoms. It will be recognized that the invention is applicable to the fluorination of a large number of halogen-containing carbon compounds. As specific examples of such compounds may be mentioned methylene chloride ($CH_2Cl_2$), fluoro-trichloro-methane ($CFCl_3$), ethyl chloride ($CH_3$—$CH_2Cl$), isopropylbromide ($CH_3$—$CHBr$—$CH_3$), ethylene dibromide ($CH_2Br$—$CH_2Br$), tetrachlorethane ($CHCl_2$—$CHCl_2$) trichlorethylene ($CHCl$=$CCl_2$), chloroform ($CHCl_3$), carbon tetrachloride ($CCl_4$), trifluoro-trichloro-ethane ($C_2F_3Cl_3$), dichloro-ethane ($C_2Cl_2H_4$), hexachlorethane ($C_2Cl_6$), tetrachlorethylene ($Cl_2C$=$CCl_2$) and halogen derivatives of higher members of the aliphatic series. As further examples of compounds containing an acyclic carbon atom having a halogen other than fluorine attached thereto may be mentioned benzotrichloride ($C_6H_5CCl_3$) benzotribromide, benzofluoro-chloride, benzofluoro-dichloride, xylenes having the alkyl groups halogenated and benzotrichloride derivatives having chlorine atoms in the aryl portion thereof. In fluorinating compounds of the character last mentioned, it has been noted that the chlorine atoms in the acyclic portion may be replaced by fluorine without affecting the chlorine atoms in the aryl portion. It will be understood that the operating conditions may vary widely depending largely upon the nature of the compound subjected to fluorination and the results desired. While halogens other than fluorine (including chlorine, bromine, and iodine) attached to acyclic carbon atoms may be replaced by fluorine in accordance with this invention, the process has thus far been particularly advantageous in the fluorination of chlorine-containing acyclic hydrocarbon derivatives. The replacement of chlorine by fluorine is more difficult than that of either bromine or iodine. The term halogenated aliphatic hydrocarbon is used in the specification and claims to mean acyclic hydrocarbons in which one or more or even all of the hydrogen atoms have been substituted or replaced by halogens.

Where the original acyclic halogen derivative contains hydrogen, a substitution of halogen for hydrogen may occur during the fluorination operation if a free halogen such as chlorine is present during the fluorination reaction. Examples of such reactions are those taking place when methylene chloride or tetrachlor-ethane are fluorinated in the presence of chlorine.

When the original acyclic halogen derivative is unsaturated, the addition of halogen and the introduction of fluorine may take place in the same operation. For instance fluoro-chloro derivatives of ethane may be prepared by passing tetrachlor-ethylene or trichlor-ethylene, hydrogen fluoride, and chlorine through the catalyst under suitable conditions of temperature and pressure.

As previously indicated, in the forms of apparatus shown, a free halogen such as bromine or chlorine may be introduced through valved inlets 25 (Fig. 1) or 125 (Fig. 2) or in any other suitable manner.

By the term "hydrogen fluoride", unless otherwise indicated, it is intended to include and to cover not only the pure product, but also hydrogen fluoride or hydrofluoric acid which may contain small amounts of impurities, as for example, water.

The carbon employed as the catalyst may be of vegetable, animal or mineral origin. Charcoal prepared from various vegetable sources, bone char from bones, coke from petroleum, coal and the like, and in general, material consisting essentially of carbon and which has been prepared by the destructive distillation of organic matter has been found to be effective. The carbon, regardless of source and mode of preparation, should preferably have adsorptive properties. Very desirable results have been obtained by carrying out reactions between hydrogen fluoride and halogenated acyclic hydrocarbon derivatives in the presence of so-called activated carbons such as may be prepared in various well known ways, for instance, by heating carbon to high temperatures in the presence of air, steam, a halogen or an inert gas. Acid washed carbon has been used with satisfactory results. In general, it is preferable that the carbon employed have a physical form of such character that it does not tend to form dust and pass out of the catalyst chamber with the gas stream. That is to say, it is desirable to prepare the carbon in the form of small pieces, lumps, or in pelleted form with or without the use of a suitable binding agent. Such carbon is referred to throughout the specification and claims as "granular" carbon.

The fluorination reaction is normally carried out with the reactants in the vapor phase when they are introduced into the catalyst. However, the temperature and pressure may be so adjusted that at least one of the reactants is in liquid phase when in contact with the catalyst. Hydrogen fluoride, for instance, is a liquid at a temperature of about 80° C. under a pressure of about 85 pounds per square inch.

The proportions of reactants contacted with the catalyst may vary within relatively wide limits depending largely upon the nature of the reactants, the conditions of operation and the results desired. Stoichiometrically, one equivalent of hydrogen fluoride corresponds to one equivalent of replaceable halogen in the compound to be fluorinated. In general, an excess of hydrogen fluoride favors the introduction of a larger number of fluorine atoms and an excess of the acyclic halogen compound favors the introduction of a smaller number of fluorine atoms. As long as the reactants are in contact with the catalyst in suitable proportions, it matters little in what manner they are introduced. In practice, it is customary to introduce the reactants into the catalyst simultaneously. Alternatively, they may be added somewhat intermittently, preferably with the initial addition of the organic halogen derivative.

The temperature at which the reaction is effected may be varied over a wide range depending largely upon the nature of the compound to be fluorinated, the catalyst, the results desired and other conditions of reaction. It is desirable, however, to carry out the reaction at a temperature below that at which decomposition of the reactants or products occurs. Chloroform is preferably fluorinated in accordance with the invention at a temperature of about 250°–350° C., carbon tetrachloride at about 350°–450° C. and trifluoro-trichloro-ethane at about 450°–650° C. It will be understood that these temperatures are preferred temperatures for the conditions and reactants described and do not represent the minimum or maximum temperatures at which reaction will occur.

The pressure under which the reaction is effected is subject to considerable variation depending largely upon the reactants, products and conditions of reaction. For the production of low boiling products the use of superatmospheric pressures may be of advantage; for the production of high boiling products the use of sub-atmospheric pressures may be found to be advantageous.

Superatmospheric pressures are particularly advantageous in fluorinating compounds which split off halogen acid at elevated temperatures. Operation under superatmospheric pressure is also advantageous in that it allows a greater capacity per unit volume of catalyst.

The products of the invention are useful for various commercial purposes. Thus, difluoro-dichloro-methane is widely used as a refrigerant. The new product penta-fluoro-chloro-ethane described in Examples III and VI also possess very desirable properties for low temperature refrigeration. Some of the higher boiling compounds such as trifluoro-trichloro-ethane and fluoro-trichloro-methane are generally applicable for use as solvents and reaction media. Moreover, many of the products investigated have been found to be advantageous in that they are odorless, non-inflammable, non-corrosive, and non-toxic.

The process herein described offers a practical and economical method of producing fluorinated products of the character above described. The vapor phase method of operation is characterized by ease of control and smoothness of operation. A catalyst such as carbon which is solid at the reaction temperature possesses many advantages over liquid catalysts previously proposed. Liquid catalysts are subject to loss by volatilization. In order to avoid such loss extra recovery apparatus is necessary, adding to the capital expenditures and increasing the cost of production. Further, certain catalysts previously proposed for liquid phase fluorination are toxic making special precautionary measures necessary in handling and operating with them. Catalysts such as carbon possess none of the foregoing disadvantages.

Some fluorinating processes have been attended by the disadvantage that even small amounts of impurities, as for example, water, may seriously impair the activity of the catalyst. In operating according to the present invention and with a catalyst such as carbon, the activity of the catalyst is not appreciably altered by the presence of small amounts of water. Another advantage of the process herein described is that undesirable side reactions do not occur. Furthermore, the carbon catalyst does not enter into the reaction chemically as is apparently the case with catalysts employed in commercial processes now in use.

As many apparent and widely different embodiments of this invention may be made without departing from the spirit thereof, it is to be understood that we do not limit ourselves to the foregoing examples or description except as indicated in the following claims.

We claim:

1. In a process of preparing organic fluorine compounds, the step which comprises reacting together in vapor phase hydrogen fluoride and a compound containing an acyclic carbon atom having attached thereto a halogen other than fluorine, in the presence of a catalyst comprising essentially carbon.

2. In a process of preparing organic fluorine compounds, the step which comprises reacting together in vapor phase hydrogen fluoride and a compound containing an acyclic carbon atom having attached thereto a halogen other than fluorine, under superatmospheric pressure, in the presence of a catalyst comprising essentially carbon.

3. In the process of preparing organic fluorine compounds, the step which comprises reacting together in vapor phase hydrogen fluoride and a compound containing an acyclic carbon atom having attached thereto a halogen other than fluorine, in the presence of added halogen, and a catalyst comprising essentially carbon.

4. In a process of preparing organic fluorine compounds, the step which comprises reacting hydrogen fluoride with a compound containing an acyclic carbon atom having attached thereto a halogen other than fluorine, in the presence of a catalyst comprising essentially carbon.

5. In a process of producing organic fluorine compounds, the step which comprises continuously reacting together in vapor phase hydrogen fluoride and a compound containing an acyclic carbon atom having attached thereto a halogen other than fluorine, in the presence of a catalyst comprising essentially carbon.

6. In a process of preparing aliphatic fluorinated hydrocarbons, the step which comprises reacting a halogenated aliphatic hydrocarbon containing a halogen other than fluorine with hydrogen fluoride in the presence of a catalyst comprising essentially carbon.

7. In a process of preparing fluorinated aliphatic hydrocarbons, the step which comprises reacting together in vapor phase hydrogen fluoride and a halogenated aliphatic hydrocarbon containing a halogen other than fluorine, in the presence of a catalyst comprising essentially carbon.

8. In a process of preparing fluorinated aliphatic hydrocarbons, the step which comprises reacting together hydrogen fluoride and a halogenated aliphatic hydrocarbon containing a halogen other than fluorine in the presence of charcoal.

9. In a process of preparing fluorinated aliphatic hydrocarbons, the step which comprises reacting together hydrogen fluoride and a halogenated aliphatic hydrocarbon containing a halogen other than fluorine in the presence of an activated carbon.

10. In a process of preparing fluorine substituted methanes, the step which comprises reacting together in vapor phase hydrogen fluoride and a halogen substituted methane containing a halogen other than fluorine, in the presence of a catalyst comprising essentially carbon.

11. In a process of preparing fluoro-trichloro-methane, the step which comprises reacting together in vapor phase hydrogen fluoride and carbon tetrachloride in the presence of a catalyst comprising essentially carbon, the proportions of hydrogen fluoride being less than one molecular weight for each molecular weight of carbon tetrachloride.

12. In a process of preparing difluoro-dichloro-methane, the step which comprises reacting together in vapor phase substantially anhydrous hydrogen fluoride and carbon tetrachloride, in the presence of a catalyst comprising essentially carbon, the proportions of hydrogen fluoride being more than one molecular weight for each molecular weight of carbon tetrachloride.

13. Penta-fluoro-chloro-ethane.

14. In a process of preparing organic fluorine compounds, the step which comprises reacting hydrogen fluoride with a halogenated hydrocarbon containing an acyclic carbon atom having attached thereto a halogen other than fluorine, in the presence of a catalyst comprising essentially carbon.

15. In a process of preparing organic fluorine compounds, the step which comprises reacting together in vapor phase hydrogen fluoride and a halogenated hydrocarbon containing an acyclic carbon atom having attached thereto at least one halogen other than fluorine, in the presence of a catalyst comprising essentially carbon.

16. In a process of preparing organic fluorine compounds, the step which comprises reacting together in vapor phase hydrogen fluoride and a halogenated hydrocarbon containing an acyclic carbon atom having attached thereto a halogen other than fluorine, under super-atmospheric pressure in the presence of a catalyst comprising essentially carbon.

17. In the process of preparing organic fluorine compounds, the step which comprises reacting together in vapor phase hydrogen fluoride and a halogenated hydrocarbon containing an acyclic carbon atom having attached thereto a halogen other than fluorine, in the presence of added halogen and a catalyst comprising essentially carbon.

18. In a process of preparing fluorine-substituted ethanes, the step which comprises reacting together in vapor phase hydrogen fluoride and a halogen-substituted ethane containing at least one halogen other than fluorine, in the presence of a catalyst comprising essentially carbon.

19. In the process of producing a fluoro-chloro-ethane, the step which comprises reacting together in vapor phase hydrogen fluoride and a chlorine-substituted ethane containing at least three chlorine atoms, in the presence of a catalyst comprising essentially carbon.

20. In a process of preparing organic fluorine compounds, the step which comprises reacting together hydrogen fluoride and a compound containing at least one acyclic carbon atom having attached thereto at least one other carbon atom and at least one halogen atom other than fluorine, in the presence of carbon as a catalyst.

21. In a process of preparing aliphatic halogenated hydrocarbons containing fluorine, the step which comprises reacting together hydrogen fluoride and a chloro aliphatic hydrocarbon in the presence of carbon as a catalyst at a temperature of at least about 200° C.

22. In a process of preparing aliphatic halogenated hydrocarbons containing fluorine, the step which comprises bringing together hydrogen fluoride and a chloro hydrocarbon containing less than three carbon atoms in contact with carbon as a catalyst at a temperature within the range of about 200° C. to about 650° C.

23. In a process of producing fluoro-chloromethanes, the step which comprises reacting together in vapor phase hydrogen fluoride and a chlorine substituted methane containing at least two chlorine atoms, in the presence of a catalyst comprising essentially carbon.

24. In a process of producing fluoro-chloromethanes, the step which comprises reacting together in vapor phase hydrogen fluoride and carbon tetrachloride in the presence of a catalyst comprising essentially carbon.

25. In a process of producing fluoro-chloromethanes, the step which comprises reacting together in vapor phase hydrogen fluoride and a chlorine substituted methane containing at least three chlorine atoms, in the presence of a catalyst comprising essentially carbon at a temperature within the range of about 250° C to about 450° C.

26. In a process of producing fluoro-chloromethanes, the step which comprises reacting together in vapor phase hydrogen fluoride and carbon tetrachloride in the presence of a catalyst comprising essentially carbon at a temperature within the range of about 350° C. to about 450° C.

27. In the process of producing a fluoro-chloroethane, the step which comprises reacting together in vapor phase hydrogen fluoride and a chlorine substituted ethane containing at least three chlorine atoms, in the presence of a catalyst comprising essentially carbon at a temperature within the range of about 450° C. to about 650° C.

HERBERT WILKENS DAUDT.
MORTIMER ALEXANDER YOUKER.